LIGHT-PRODUCING APPARATUS

Filed July 3, 1962 7 Sheets-Sheet 1

INVENTOR.
Arthur J. Sable
BY Brown and Mikulka
and
Robert E. Cook
ATTORNEYS

Arthur J. Sable
Inventor

LIGHT-PRODUCING APPARATUS
Filed July 3, 1962 7 Sheets-Sheet 3
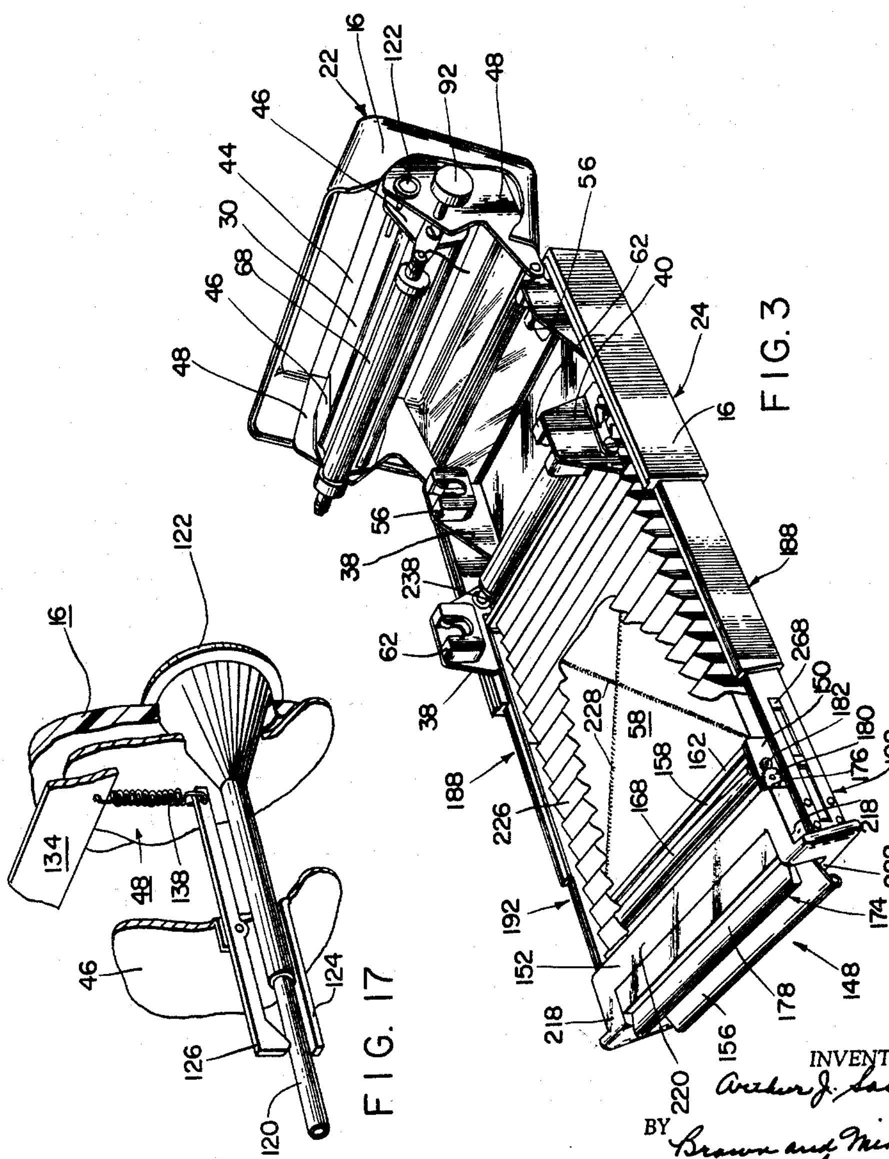
INVENTOR
Arthur J. Sable
BY Brown and Mikesell
and
Robert E. Cook
ATTORNEYS March 23, 1965 A. J. SABLE 3,174,419
LIGHT-PRODUCING APPARATUS
Filed July 3, 1962 7 Sheets-Sheet 4
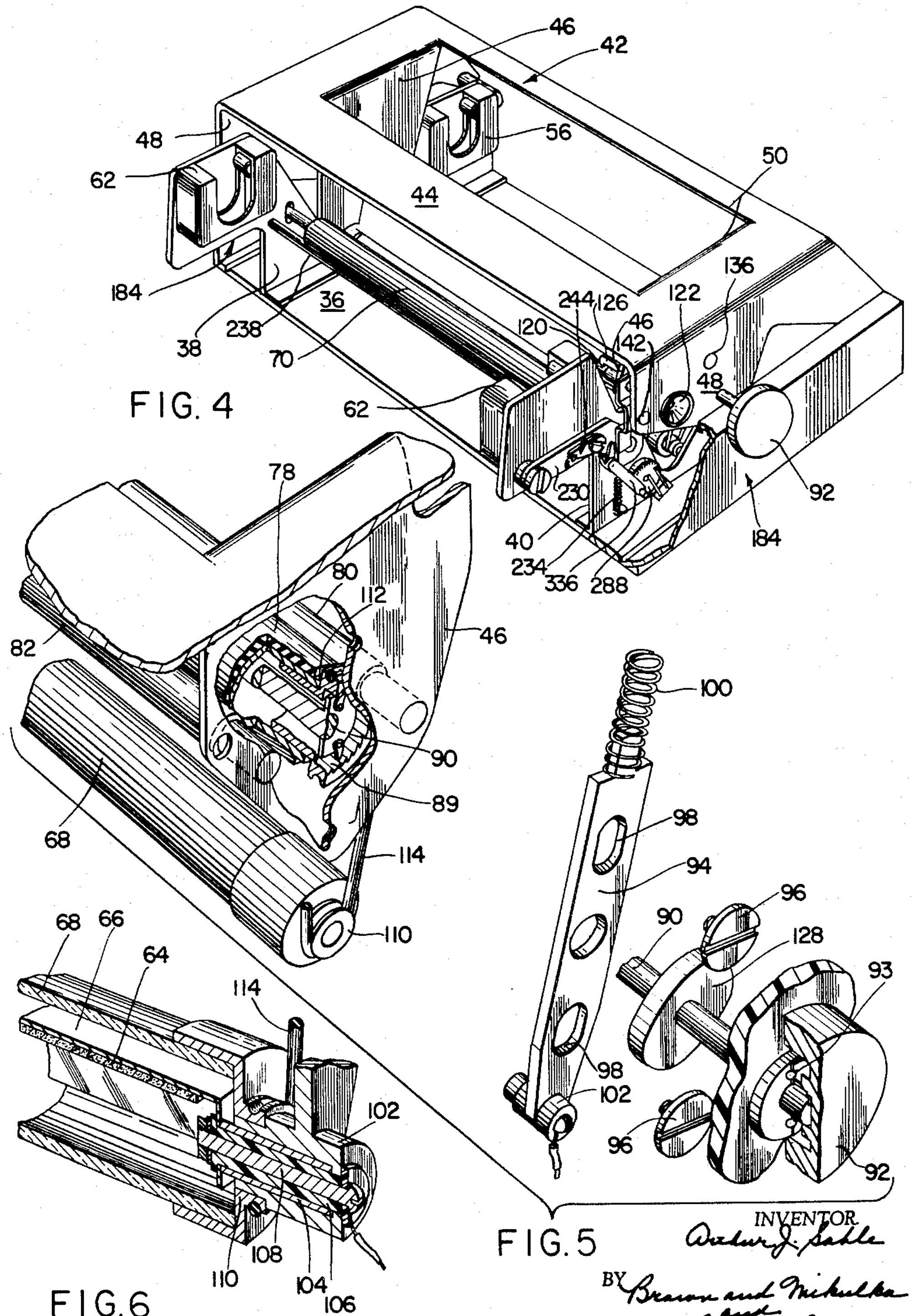
INVENTOR
Arthur J. Sable
BY Brown and Mikulka
and
Robert E. Cork
ATTORNEYS

LIGHT-PRODUCING APPARATUS

Filed July 3, 1962

INVENTOR.
Arthur J. Sable

BY Brown and Mikulka
and
Robert E. Cork
ATTORNEYS

INVENTOR.
Arthur J. Sable

BY Brown and Mikulka
and
Robert E. Cook
ATTORNEYS

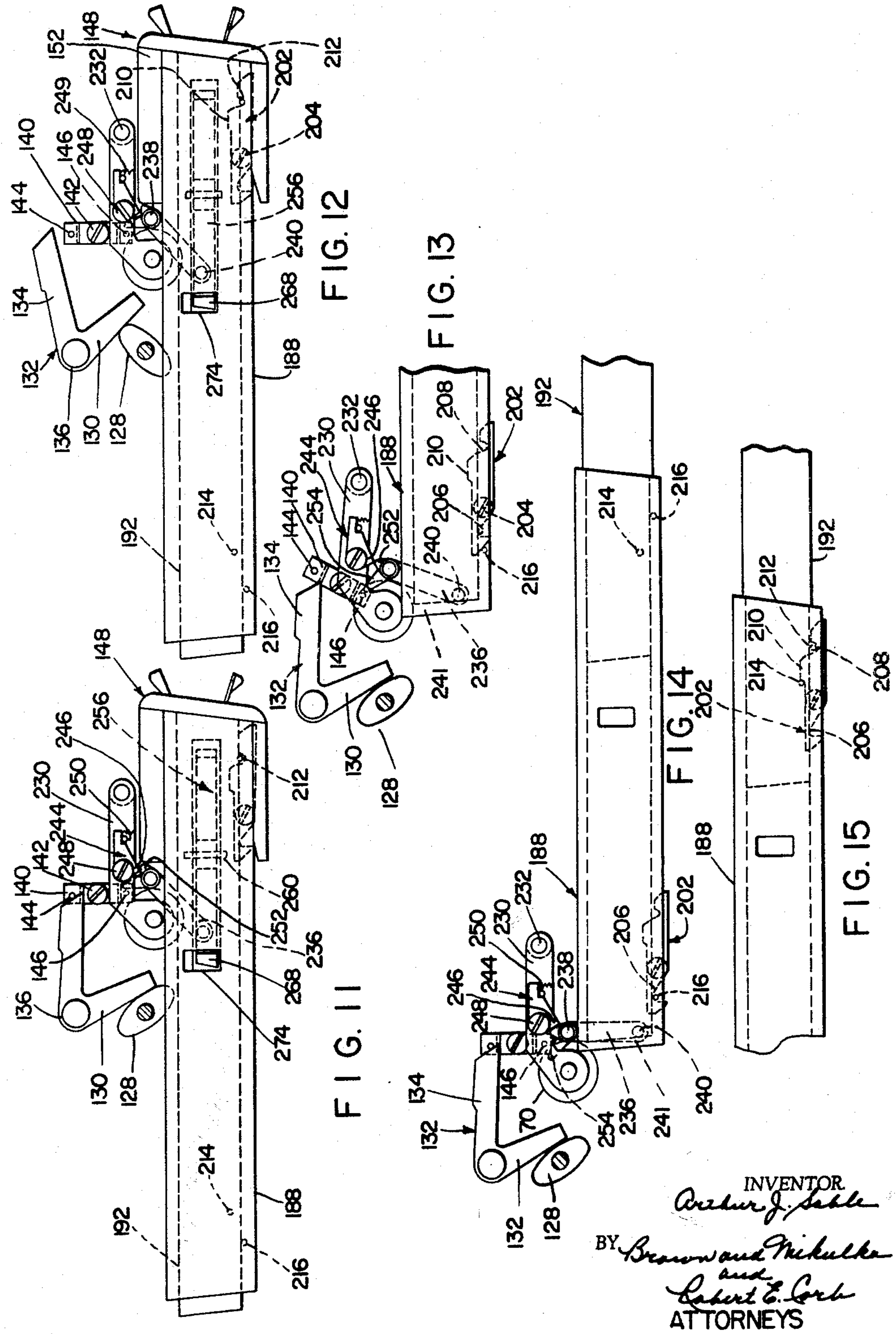
INVENTOR.
Arthur J. Sable
BY Brown and Mikulka
and
Robert E. Corb
ATTORNEYS

United States Patent Office 3,174,419

Patented Mar. 23, 1965

3,174,419

LIGHT-PRODUCING APPARATUS

Arthur J. Sable, Boston, Mass., assignor to Polaroid Corporation, Cambridge, Mass., a corporation of Delaware Filed July 3, 1962, Ser. No. 207,184
15 Claims. (Cl. 95—75)

This invention relates to light-producing apparatus and more particularly to apparatus useful in photography.

In my copending U.S. patent application Serial No. 207,183, filed on even date herewith, there is described a photographic apparatus in the form of a document copier in which a photographic image-recording medium is moved relative to a source of actinic light during exposure; and the light source is caused to emit light in pulses of uniform character and duration and at a frequency related to the transport speed of image-recording material relative to the light source. The apparatus described may be operated entirely manually and includes on electric generator and a light source powered by current from the generator. Because the apparatus is operated manually, the frequency of light pulses may be required to vary over a wide range; and, even though the frequency varies, the duration and character of the light pulses is required to remain uniform. There are a number of advantages to employing an electroluminescent source of light in the apparatus particularly as such sources may be operated at much higher frequencies than incandescent lamps, are less expensive than gas discharge lamps and can be excited to produce light pulses of uniform duration actinic to the image-recording medium and having uniform luminescent characteristics.

An object of the invention is to provide novel and improved apparatus including an electroluminescent light source and means for exciting the light source to produce light pulses at varying frequency yet of uniform duration and constant luminescent characteristics, particularly intensity and spectral distribution.

Electroluminescent light sources are generally characterized as voltage-sensitive devices because they require relatively high voltages but very little current for excitement to light emission. The brightness or intensity of the light produced is more a function of the rate of change in the exciting voltage than of the magnitude of the voltage change and is substantially independent of the current.

Other objects of the invention are: to provide apparatus of the character described in which the electroluminescent light source is excited to light emission by current from a piezoelectric crystal generator; and to provide a piezoelectric generator for exciting an electroluminescent light source to light emission in pulses of uniform character over a wide range of frequencies.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

FIG. 3 is a perspective view, partially in section, illustrating the apparatus of FIGURE 1 with the housing thereof open and components of the apparatus shown in one of the operative positions thereof;

FIG. 4 is a perspective view with parts broken away of a portion of the apparatus shown without the housing;

FIG. 5 through 10 are fragmentary perspective views, partially in section, illustrating details of the construction of the apparatus;

FIGS. 11 through 15 are somewhat schematic, elevational views of the mechanism of the apparatus showing various operative positions thereof to illustrate the operation of the apparatus;

FIG. 17 is a fragmentary plan view partially in section illustrating components of the apparatus.

Figure 1:
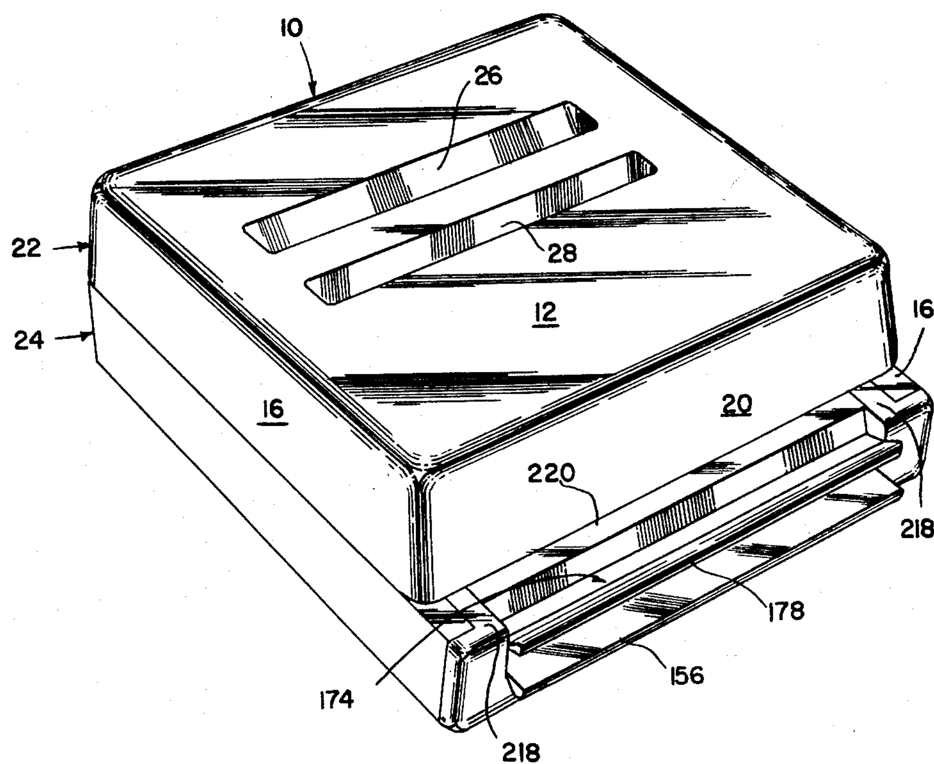
FIGURE 1 is a perspective view of photographic apparatus in the form of a document copier embodying the invention.

Reference is now made to the drawings wherein there is illustrated photographic apparatus in the form of a document-copying device incorporating the invention. The document-copying apparatus comprises a generally parallelepiped-shaped housing designated 10 including an upper wall 12, lower wall 14, side walls 16 and end walls 18 and 20. The housing is formed in two sections designated an upper section 22 and a lower section 24, pivotable with respect to one another between a closed or operative position shown in FIGURE 1 and an open or inoperative position shown in FIG. 3, to permit loading of photographic materials into the housing. The mating portions of the side and end walls of the upper and lower housing sections are formed with engaging shoulders to prevent the admission of light into the housing when the housing is in closed position. The upper section of the housing is provided with two passages termed an entrance passage 26 and an exit passage 28 through which original documents are introduced into and withdrawn from the apparatus. The entrance passage, located closest to end wall 18, includes walls 30 converging to a narrow gap for guiding original documents into the housing into superposition with an image-recording sheet. Exit passage 28 is located adjacent entrance passage 26 between the latter and end wall 20 and is defined by walls 32 which guide original documents from the housing following exposure in superposition with an image-recording sheet. The lower section of the housing includes an end wall 33 located inwardly from end wall 20 so that the end of the upper housing section overhangs the lower housing section. End wall 33 is provided with a withdrawal opening 35 through which sheet materials treated within the apparatus can be withdrawn therefrom.

The document-copying apparatus, or a camera, incorporating the invention is of the type in which a succession of areas of a photosensitive image-recording sheet are photoexposed to produce images therein and each area, following exposure, is superposed with an area of a second sheet, and a liquid is distributed between the superposed areas of the two sheets to form a sandwich in which the image-recording sheet is processed to form a visible image. The preferred processing involves the exposure of an image-recording sheet comprising a gelatino silver halide carried on a flexible support sheet, and treatment of the emulsion with a liquid to produce a silver transfer image on the second sheet by a silver halide diffusion-transfer reversal process. For examples of materials useful in such processes, reference may be had to U.S. Patent No. 2,543,181, issued February 27, 1951, in the name of Edwin H. Land.

The housing of the apparatus is intended primarily as a light-tight enclosure for the operating components of the apparatus which, for the most part, are mounted on two frame members enclosed within the two housing sections and movable with respect to one another together with the housing sections to permit loading of materials into the apparatus. These frame members include a lower frame 34 comprising a base plate 36 and a pair of side plates 38 and 40 extending upwardly from the base plate which rests on lower wall 14 of lower housing section 24. An upper frame 42 is provided comprising a base plate 44 disposed adjacent upper wall 12 of upper housing section 22 and having two pairs of lateral support members 46 and 48 dependent from base plate 44. The upper and lower support frames are best illustrated in FIG. 4 in which they are shown in the operative position of the apparatus in which support member 48 is located outermost. Support members 46 are located innermost, and each of side plates 38 and 40 is disposed between support members 46 and 48. Suitable means may be provided coupling the side plates and support members of the upper and lower frames for pivotal movement with respect to one another. Base plate 44 of upper frame 42 is provided with an opening 50 through which portions of the housing, including walls 30 and 32 defining passages 26 and 28, extend.

As previously indicated, the document-copying apparatus is designed to produce copies of original documents by a photographic process involving the exposure of a photosensitive image-recording sheet. Exposure of the photosensitive sheet may be either of two different types, i.e., "reflex" or "direct." Direct exposure of the photosensitive material describes an exposure process in which the light is transmitted through the original to the photosensitive material and is useful when the original has subject matter on only one side and the material comprising the original is transmissive to light actinic to the photosensitive material. When the original has subject matter on both sides or is not transmissive to actinic light, the reflex exposure is used; and this involves transmitting the actinic light through the photosensitive sheet to the surface (of the original) to be copied which reflects some of the light back to the photosensitive material further exposing the photosensitive material to form an image therein.

The photosensitive image-recording sheet, designated 52, is in the form of an elongated web or strip of sufficient length to make a plurality of copies and is mounted on a spool 54 of conventional design and including shafts on its end engaged for pivotal movement in mounting clamps 56 supported on side plates 38 and 40 of the lower frame near end wall 18. A supply of a second or image-receiving sheet 58 preferably equal in width and length to the photosensitive sheet is coiled on a conventional spool 60 including shafts at its end pivotally engaged in mounting clamps 62 supported on side plates 38 and 40 adjacent the opposite end of lower frame 34 from spool 54 and located so that spool 60 is disposed within the upper, overhanging portion of the housing closely adjacent upper wall 12 and end wall 20.

The apparatus includes means for subjecting the image-recording sheet to both reflex and direct types of exposure comprising two electroluminescent light sources and means for conducting the photosensitive sheet and an original in superposition past the sources to effect exposure of the photosensitive sheet. In the form shown, each light source comprises an electroluminescent phosphor and electrodes through which current is passed for exciting the phosphor to light emission. The light emitting electroluminescent sources each comprising the phosphor and electrodes, designated with the reference numeral 64, are elongated and at least equal in length to the width of the area of the image-recording sheet to be exposed, preferably extending from side to side of the image-recording sheet; and each is mounted within a channel-shaped support member 66 in position to emit light toward the other electroluminesecent source. One of the electroluminescent sources and the channel in which it is mounted are mounted on lower frame 34 between side plates 38 and 40 while the other electroluminescent source and channel are mounted on upper frame 42 between support members 46. The phosphor comprising each electroluminescent source is selected to emit light, actinic to the photosensitie material comprising the image-recording sheet preferably within the visible wave length range, and of uniform intensity throughout the length of the electroluminescent source.

The document-copying device includes means for guiding photosensitive sheet 52 from spool 54 in position for exposure between the two electroluminescent light sources and for superpositioning an original to be copied with the photosensitive sheet during movement thereof relative to and between the light sources during exposure of the image-recording sheet. These guide means comprise a cylindrical tube 68 disposed in surrounding relation to the upper electroluminescent light source 64 and the channel 66 in which it is mounted. Tube 68 is formed of a material transparent to actinic light such as glass or organic plastic materials and is mounted for rotation about its axis in a manner to be described. Distribution of a processing liquid between an exposed area of the image-recording sheet and an area of second sheet 58 superposed therewith is accomplished by moving the sheets in superposition between a pair of juxtaposed pressure-applying members shown herein as rolls 70 and 72. The motive power for rotating feed roll 78 is derived from the photosensitive sheet at tube 68 which is rotated by the photosensitive sheet and in turn drives roll 78 through a transmission so as to advance an original document from the apparatus through passage 28 following exposure of a photosensitive sheet in superposition with the original. Roll 78 is mounted for rotation about its axis on support members 46 and is connected through an overrunning clutch 89 and a shaft 90 to a crank or knob 92 located outside of the housing in position to be grasped and rotated manually. Knob 92 may be rotated in a clockwise direction viewing FIGS. 4 through 6 for rotating roll 78 so as to feed an original document through passage 26 into the apparatus. Tube 68 and the light source and channel enclosed within the tube are mounted at their ends on support plates 94 each mounted in turn on a support member 46 by a pair of shoulder screws 96 threaded into a support member 46 and engaged in a slot 98 in support plate 94 thereby permitting limited movement of the support plate and tube 68 with respect to rolls 78, 80 and 82 mounted on support members 46. Each of support plates 94 is biased by a spring 100 urging tube 68 downwardly away from roll 78; and includes a downwardly extending portion on the lower extremity of which is mounted a hub 102. Each end of channel 66, located within tube 68, is secured to a support sleeve 104 engaged in hub 102. Extending through each of sleeve 104 is an insulating sleeve 106 surrounding an electrical connector 108 for supplying current to the electroluminescent light source. Tube 68 is mounted on hubs 110 at its ends, and these in turn are mounted for rotation on the inner ends of hubs 102. One of hubs 110 comprises a pulley. Another pulley designated 112, is coupled with roll 78, and an O ring 114 is provided for coupling the two pulleys so that rotation imparted to either tube 68 or roll 78 is transmitted to the other. By virtue of this arrangement, when the photosensitive sheet is moved through the apparatus to be exposed and processed, tube 68 is rotated in turn rotating rolls 78, 80 and 82 to advance the original from the apparatus through passage 28 while knob 92 outside of the housing remains stationary as a result of the coupling of the knob to roll 78 through overrunning clutch 89, shown incorporated into pulley 112. The movable mounting of tube 68 on support plates 94 in turn mounted on upper frame 42 insures both the right tension on O ring 114 and the proper positioning of the tube with respect to guide roll 74 and roll 72 mounted on lower frame 34 when the two frames are pivoted into operative position.

Each successive area of the photosensitive sheet is advanced between pressure-applying rolls 70 and 72 in superposition with second sheet 58 and a liquid processing composition is distributed between the sheets. Roll 72 is mounted in fixed position between side plates 38 and 40 while roll 70 is mounted with its axis in the same plane as the axis of roll 72 for movement toward and away from roll 72. As a means for mounting roll 70, there are provided a pair of arms 230 each pivotally mounted at one end on a side plate 38 or 40 with roll 70 journaled at its ends in the other ends of arms 230. Tension springs 234 are provided coupled between each of arms 230 and the side plate (38 or 40) on which the arm is mounted for urging roll 70 downward toward roll 72 into juxtaposition with the latter for applying compressive pressure to the photosensitive and second sheets as the latter are advanced in superposition between rolls 70 and 72.

The processing liquid is provided between the sheets on at least one of the sheets in the vicinity of the bite of rolls 70 and 72 and is distributed between and in contact with the sheets at the bite of the rolls as the sheets are advanced therebetween. In the document-copying apparatus shown, the processing liquid for each exposed area of the photosensitive sheet is provided on second sheet 58 in the form of an elongated mass extending from side to side of the second sheet near the leading edge of the area of the second sheet which is superposed with the exposed area of the photosensitive sheet. Second sheet 58 extends from spool 60 around a portion of the periphery of roll 70 into superposition with photosensitive sheet 52 at the bite of rolls 70 and 72, and it is on the portion of the second sheet extending between spool 60 and roll 70 that this mass of processing liquid is provided for subsequent distribution between the sheets. As the two sheets are advanced, the mass of processing liquid is carried by the second sheet into the bite of rolls 70 and 72 where it is caused to be advanced relative to and in contact with the sheets toward the trailing end of the exposed area of the photosensitive sheet. Some of the liquid adheres to the facing surfaces of the sheets and is carried between the pressure-applying rolls and serves to adhere the two sheets together to form a sandwich. Only a portion of the mass of liquid provided for processing each exposed area of the photosensitive sheet is carried by the sheets between the pressure-applying rolls so that a quantity of the liquid may remain between the sheets at the bite of the rolls after an exposed area of the photosensitive sheet has passed between the pressure-applying rolls.

The processing liquid required for each exposed area of the photosensitive sheet is supplied in an elongated tubular container very much like a conventional drinking straw. This container, designated 120 in FIG. 2, contains a cavity of substantially round cross section approximately equal in length to the width of the exposed area of the photosensitive sheet and filled with the processing liquid. Containers of this type, their construction and function are described in detail in the U.S. Patent No. 3,047,387, issued to Edwin H. Land on July 31, 1962.

Figure 2:
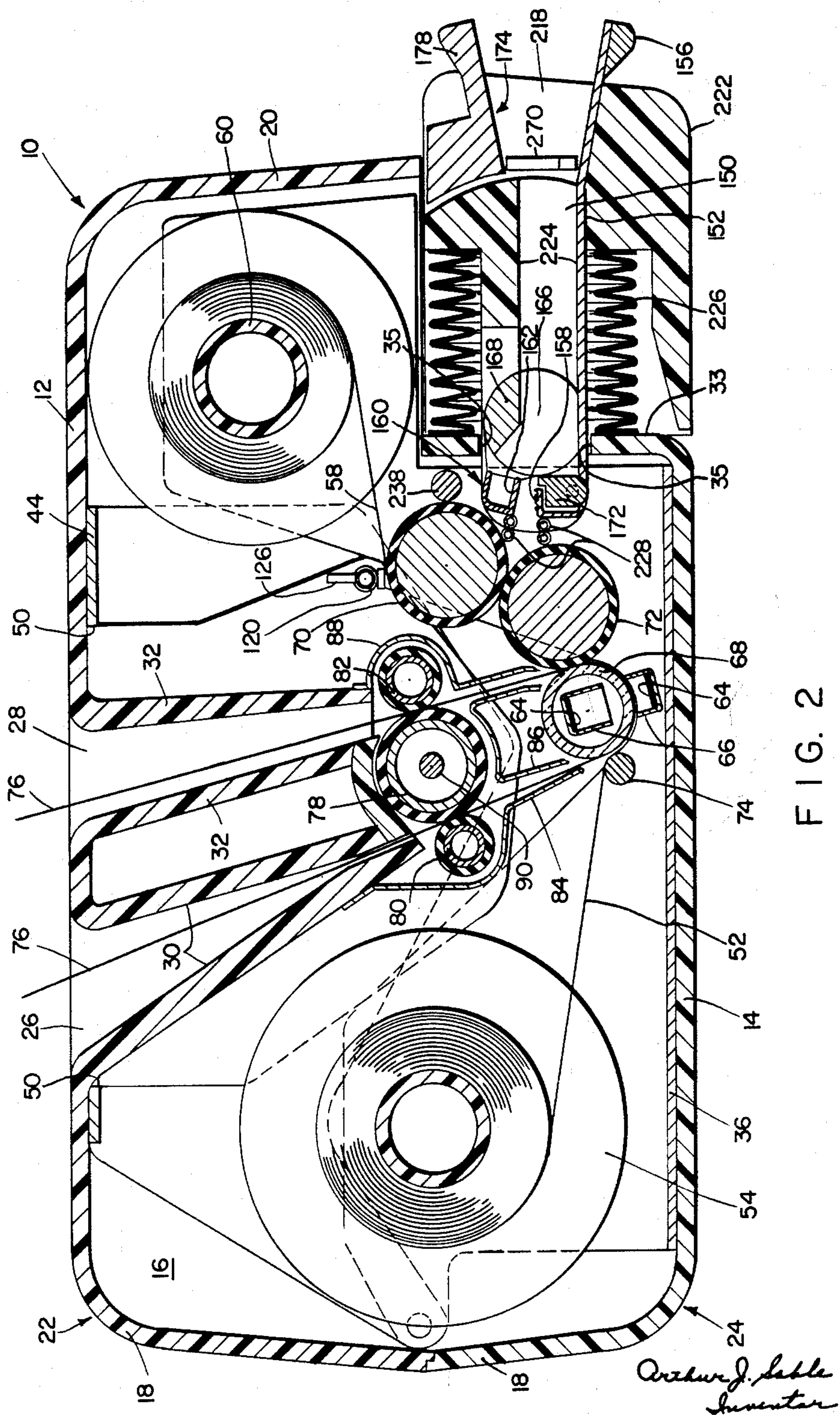
FIG. 2 is a sectional view of the apparatus of FIGURE 1 taken through a plane substantially midway between the sides thereof.

The apparatus includes means for allowing the container to be introduced into the apparatus so that it extends across and adjacent a portion of second sheet 58 in the position shown in FIG 2 located above sheet 58. These means comprise a funnel-shaped tube 122 mounted between support members 46 and 48 with its flared end opening outside of the housing and with its narrow, tubular end disposed within the housing to the inside of support member 46. Tube 122 is positioned for guiding container 120 into the housing into the position shown with the container extending across the second sheet from side to side thereof. Introductory movement of the container is arrested with the trailing end (from which the liquid is dispensed) of the container located substantially in alignment with the lateral edge of the area of the second sheet in contact with which the liquid is to be distributed. The fluid contents of the container are ejected therefrom by compressing the container at a location adjacent the inner of tube 122 and the lateral edge of the area of the second sheet to be treated and withdrawing the container, while applying compressive pressure to it, across the second sheet through tube 122 from the housing.

Means are provided within the housing mounted on support member 46 for engaging and applying compressive pressure to the container during withdrawal movement thereof. These means comprise a backing member 124 mounted in fixed position on support member 46 adjacent one side of the opening at the inner end of tube 122. A compression member 126 is mounted for pivotal movement intermediate its ends on support member 46. The inner end of compression member 126 is movable toward and away from the inner end of backing member 124 for engaging and compressing the container between the inner ends of members 124 and 126.

The apparatus includes means actuated by rotation of knob 92 for pivoting compression member 126 toward backing member 124 to compress the container during withdrawal thereof across the second sheet between the backing and compression members. These means are responsive to the rotation of knob 92 for moving the backing and compression members toward one another as an original document is being fed into the apparatus and comprise a cam 128 mounted on shaft 90 intermediate support members 46 and 48. Knob 92 and shaft 90 are designed to be rotated through 180° for feeding an original into the apparatus with detent means 93, comprising a spring disc and two balls, being provided within knob 92 for limiting the movement of the knob and shaft. Cam 128 coacts with one arm designated 130 of a V-shaped crank 132 including a second arm 134 and mounted for pivotal movement at the apex of arms 130 and 134 on a stud 136 supported between support members 46 and 48. Arm 134 is connected to an end of compression member 126 by a spring 138 and crank 132 is biased by a torsion spring (not shown) in a counterclockwise direction viewing FIG. 6 to the position shown in FIG. 11, to retain arm 130 in contact with cam 128. When cam 128 is pivoted to the position shown in FIG. 12, crank 132 is pivoted by the cam in a clockwise direction applying tension to spring 138 for pivoting compression member 126 to move the end thereof opposite spring 138 toward backing member 124. Spring 138 is provided as a connection between arm 134 and compression member 126 to insure the application of a uniform predetermined pressure on the container regardless of the manner in which cam 128 is rotated, and this pressure is designed to compress the pod sufficiently to cause the complete ejection of its fluid contents while not engaging the pod so firmly as to prevent its withdrawal between the compression and backing members.

Figure 7:
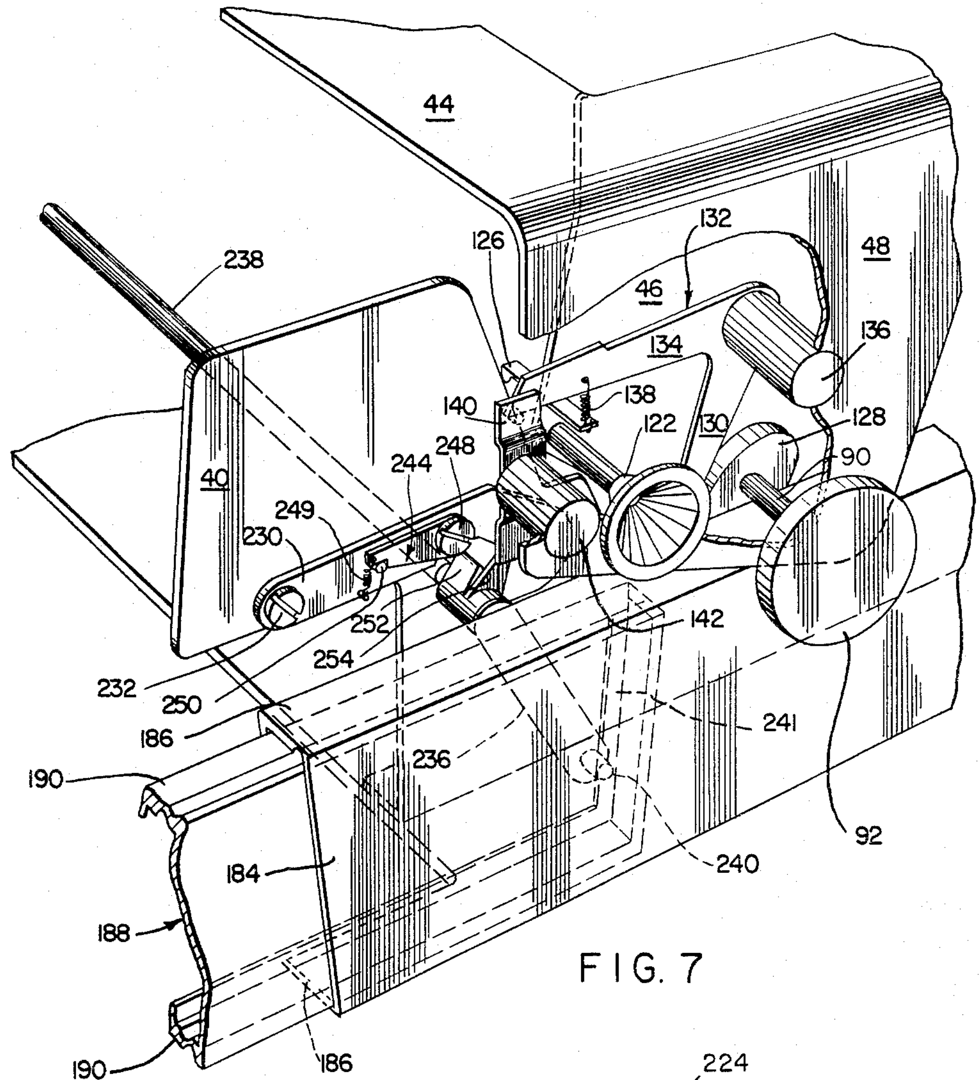

Crank 132 is pivoted during the initial operation of the apparatus prior to exposure of an area of the photosensitive sheet to be treated with the liquid contents of the container which is being compressed by the rotation of crank 132; and accordingly, means are provided for retaining crank 132 in the pivoted position so that the compression member and the backing member retain their grip on the container until after withdrawal of the container from the apparatus. These means comprise a latch member 140 pivotally mounted intermediate its ends on a stud 142 supported on one of support members 48. Latch member 140 is biased for rotation (in a clockwise direction viewing FIG. 7—counterclockwise viewing FIGS. 11 through 14) and is pivotable in a clockwise direction from its rest position shown in FIG. 11. Latch member 140 is provided with a pin 144, which in the rest position of the latch member is located against the end of arm 134, the latter being inclined so as to coact with pin 144 to pivot latch member 140 in a clockwise direction when cam 128 is pivoted through 90° to rotate crank 132 in a counterclockwise direction as shown in FIG. 12. After the end of arm 134 has moved past and from engagement with pin 144, latch member 140 returns in a counterclockwise direction, as shown in FIG. 12, to its original position with pin 144 underlying the end of arm 134 and preventing clockwise movement of crank 132. Means including a second pin 146 on the opposite end of latch member 140 are provided for preventing counterclockwise motion of the latch member past its position of rest and from its latch position.

Movement of the sheets through the apparatus is a manual operation, and means are provided operable manually for gripping the sandwich and drawing it between rolls 70 and 72 through opening 35. The means for gripping a sandwich and withdrawing it between the pressure-applying rolls also cooperate to meter the lengths of the two sheets advanced through the apparatus and between the pressure-applying rolls during exposure and processing of each successive exposed area of the photosensitive sheet. Spool 60, on which is coiled a supply of second sheet 58, is located in a portion of the upper housing section 22 of housing 10 adjacent end wall 20 which overhangs the lower section 24 of the housing, the latter terminating in the region of rolls 70 and 72 at end wall 33 although side walls 16 on the lower housing section extend to end wall 20. The means for gripping and advancing the sandwich is mounted under this overhanging portion of the upper housing section between side walls 16 and is movable reciprocally with respect to rolls 70 and 72 between a position underlying the portion of the housing adjacent end wall 33 to a position remote from the pressure-applying roll and apart from the housing. These means comprise a frame or carriage, generally designated 148, including lateral support members 150 spaced from one another by a distance greater than the width of the sheets and a transverse member 152 joining the support members and cooperating to provide a passage through which the sandwich is moved relative to the carriage. Transverse member 152 includes a manually engageable outer end section 156 and an inner end section bent upwardly and back upon itself to form a fixed gripping jaw 158. Jaw 158 is at least equal in length to the width of the sandwich, extends transversely of the direction of movement of the sandwich and has a gripping surface located, at the retracted position of the carriage shown in FIG. 2, closely adjacent pressure-applying roll 72 and the lower side of the path of movement of the sandwich between the pressure-applying rolls.

The gripping means include another gripping member movable toward and away from gripping jaw 158. This movable gripping member designated 160 includes an elongated gripping jaw 162 disposed in juxtaposition with jaw 158, at least equal in length to jaw 158 and having a lower gripping surface facing the gripping surface of jaw 158, located adjacent and to the opposite side of the path of movement of the sandwich. Jaw 162 is mounted at its ends on a pair of arms 164 in turn pivotally mounted on shafts 166 pivotally mounted on lateral support members 150 of carriage 148. Jaw 162 is thus pivotable toward and away from jaw 158 about the axis of shafts 166 which axis is located approximately in the path of movement of the sandwich between jaws 158 and 162.

Following withdrawal of a length of the sandwich including an exposed area of the photosensitive sheet and a corresponding area of the second sheet on which a transfer print is formed, the portion of the sandwich withdrawn and including the print, is severed from the remainder of the sandwich extending between the pressure-applying rolls. Accordingly, the apparatus includes a cutting device associated with the gripping means for severing the portion of the sandwich extending beyond the gripping means from the portion of the sandwich extending between the pressure-applying rolls and the gripping jaws. This cutting device comprises a rotary knife 168 including end members 170 on which the knife, which is at least equal in length to the width of the sheets, is mounted coaxially with gripping member 160 on shafts 166. The knife in the position shown in FIG. 2 is disposed to the same side (upper) of the path of movement of the sandwich as jaw 162 and includes a helical cutting edge positioned to cut against a corner of an anvil 172, equal in length to knife 168 and mounted on transverse member 152 adjacent jaw 158. Anvil 172 is mounted on transverse member 152 for pivotal movement of the cooperating corner of the anvil toward and away from knife 168 and is biased by spring means in a clockwise direction (viewing FIG. 2) toward the knife. The end members 170 supporting knife 168 include circular peripheries located in the cylindrical plane of movement of the cutting edge of the knife and cooperate with a face of the anvil at the corner thereof for locating the anvil in proper position with respect to the cutting edge of the knife.

The gripping and cutting device includes a movable lever 174 comprising a pair of arms 176 each pivotally mounted at one end on a lateral support member 150 for rotation about an axis parallel with and adjacent the axis of knife 168. Mounted on the opposite ends of arms 176 is a connecting member 178 located oustide of the apparatus in juxtaposition with outer end section 156 and located on the opposite side of the path of movement of the sandwich from end section 156. At least one of arms 176 is provided on its end with a sector gear 180 meshed with a pinion 182 keyed to one of shafts 166 so that rotary movement of lever 174 (viewing FIG. 2) is transmitted to the knife rotating the latter in a clockwise direction. In the operation of the cutting and gripping device, end section 156 and connecting member 178 are grasped manually to pivot movable lever 174 toward end section 156 of transverse member 152. This in turn causes pivotal movement of the knife and the movable gripping member 160 toward anvil 172 and gripping jaw 158. Movable gripping jaw 162 is connected to the knife through a torsion spring 177 seated in a recess in end member 170. Spring 177 biases jaw 162 in a clockwise direction viewing FIG. 2, movement of the latter relative to the knife being limited by a pin 179 on member 170 engaged in a sector shaped recess 181 in arm 164. By virtue of this construction, jaw 162 moves ahead of the cutting edge of the knife and grips the end of the sandwich extending beyond rolls 70 and 72 and the movable and fixed gripping jaws and comes to a stop while rotation of the knife continues. Any part of the sandwich extending past the corner of anvil 172 between the latter and the knife is severed from the portion of the sandwich engaged between jaws 162 and 158.

The apparatus includes means for mounting the carriage for reciprocal movement toward and away from the pressure-applying rolls and also determining the length of the sandwich advanced between the pressure-applying members. The means for supporting the carriage for reciprocal movement comprises two sets of extensible supporting tracks mounted on opposite sides of the apparatus with the carriage supported between the sets of tracks. Each set of tracks comprises three individual tracks including a fixed track 184 having a C-shaped cross section comprising upper and lower guides 186 mounted on base plate 36 adjacent a side plate 38 or 40; an intermediate track 188 having a C-shaped cross section slidably engaged between upper and lower guides 186 of fixed track 184 and including upper and lower guides 190; and an end track 192 including upper and lower edges 194 slidably engaged between upper and lower guides 190 of intermediate track 188. To facilitate telescoping movement of the tracks with respect to one another, the upper and lower guides, the fixed and intermediate tracks and the upper and lower edges of the end tracks are provided with matching grooves 196 for containing ball bearings 198. The upper and lower guides 186 of fixed track 184 and edges 194 of end track 192 are each provided with a single groove 196 with the grooves in the upper and lower guides 186 of the fixed track facing one another and being in the lower and upper surfaces respectively of the upper and lower guides while the grooves in the upper and lower edges respectively of end track 192 face away from one another. The upper and lower guides 190 of intermediate track 188 are each provided with two grooves in opposite surfaces located in alignment with corresponding grooves in the fixed and end tracks. The balls provided in each pair of grooves 196 in adjacent portions of the tracks cooperate with stop pins 200 at the ends of the grooves for limiting the extension of the telescoping tracks. Carriage 148 is supported between end tracks 192, and the length of the tracks and the dimensions of the carriage are such that in the retracted position of the tracks, the tracks and carriage are located almost entirely within the housing of the apparatus with no more than the outer section of the carriage and outer end section 156 and connecting member 178 projecting from the housing beyond the overhanging section thereof and end wall 20.

The apparatus includes means for controlling the relative movement of the various telescoping tracks during extension and retraction thereof. These means, in the form shown, comprise latch members 202 mounted within the apparatus intermediate their ends for pivotal movement about studs 204 supported on side plates 38 and 40. Each of latch members 202 includes a downwardly facing engagement notch 206 at its inner end and an upwardly facing engagement notch 208 at its outer end with a raised cam section 210 located intermediate stud 204 and notch 208. Each of latch members 202 is biased by a spring (in a counterclockwise direction viewing FIGS. 11 through 15) so that notch 206 is biased downwardly and notch 208 is urged upwardly. The notches are designed to engage pins on the intermediate and end tracks for holding the intermediate tracks stationary until the end tracks are fully extended and then permitting extension of the intermediate tracks; and for retaining the intermediate tracks fully extended until the end tracks have been retracted and then releasing the intermediate tracks for retraction. Each of the intermediate tracks includes a pin 212 located near its outer ends and engaged in notches 208 when the intermediate track is in retracted position (see FIGS. 11 and 12). Each of the end tracks includes a pin 214 located near its inner end and in the retracted position of both the intermediate and end tracks, in the vicinity of end wall 18. During the latter portion of the movement of end tracks 192 into extended position, pins 214 engage cam sections 210 of latches 202, as shown in FIG. 15, depressing the latches to permit disengagement of pins 212 from notches 208 thereby allowing the intermediate tracks to move into extended positions. The intermediate tracks are provided near their inner end with pins 216 which ride under the inner ends of latches 202 (as shown in FIG. 13), which are inclined for this purpose, and become engaged in notches 206 when the intermediate tracks are in extended position, as shown in FIG. 14. Notches 206 and pins 216 cooperate to prevent retraction of intermediate tracks 188 until the latches are released, this being accomplished by retracting end tracks 192 until pins 214 engage cam sections 210 pivoting latches 202 to disengage pins 216 from notches 206. Thereafter retraction of the intermediate tracks and the end tracks is continued until complete; and, just prior to termination of the retracting movement of the intermediate tracks, pins 212 ride over and duplicate the outer ends of the latches, which are sloped for this purpose, and become engaged in notches 208 where they cooperate with the notches to retain the intermediate tracks against extension until released as previously described.

As the sandwich is withdrawn between rolls 70 and 72 through withdrawal opening 35 in end wall 33 the photosensitive sheet is still sensitive to light and should remain in a light-free environment until formation of the transfer image is complete. This period termed an "imbibition" period may vary from a few seconds to a minute or more and is preferably as short as possible. Accordingly, the apparatus includes means providing a light-tight environment into which the sandwich is withdrawn between the pressure-applying rolls. These means comprise a housing associated with carriage 148 and including side walls 218 located outside of and closely adjacent lateral support members 150, an upper wall 220 extending between side walls 218 and a lower wall 222 also extending between side walls 218 and cooperating with the latter and upper wall 220 to provide a passage 224 through which the sandwich is movable. The housing, mounted on the carriage, is connected to end wall 33 of housing 10 by an extensible bellows 226 secured at one end to end wall 33 surrounding withdrawal opening 35 and connected at its other end to side walls 218, upper wall 220 and lower wall 222. The bellows cooperates with housing 10 and the housing on the carriage to provide an extensible chamber between the carriage and housing 10 into which the sandwich is withdrawn from the housing through opening 35. Connecting member 178 is constructed to function as a closure for passage 224 when pivoted toward outer end section 156 of transverse member 152 by the simultaneous grasping of outer end section 156 and connecting member 178 for simultaneously gripping a portion of the sandwich between jaws 158 and 162 severing any part of the sandwich extending past anvil 172. The carriage is then moved away from housing 10 withdrawing the sandwich into the chamber defined by bellows 226 and passage 224. Movement of the carriage is continued until the carriage reaches its fully extended position; and, depending on the length of the imbibition period required, transverse member 152 is held in its downward position against end section 156 until the imbibition period has expired. Thereafter, the carriage is returned to its retracted position shown in FIG. 2 where the portion of the sandwich including an exposed area of the photosensitive sheet and a print on the second sheet may be severed by again squeezing connecting member 178 toward end section 156.

Extensible means are provided in the apparatus for supporting the portion of the sandwich extending from the gripping jaws to rolls 70 and 72 particularly during the return movement of the carriage from its extended to its retracted position so that the sandwich does not buckle and prevent return movement of the carriage. In the form shown, this last-mentioned means comprises a pair of X springs 228 located between pressure-applying rolls 70 and 72 and gripping jaws 158 and 162 above and below the path of movement of the sandwich between the rolls and gripping jaws.

The treatment of the image-recording sheet involves the distribution of a quantity of processing liquid in contact with the surfaces of the photosensitive and second sheets; and in most cases, a quantity of the liquid remains between the sheets at the bite of the pressure-applying rolls after areas of the two sheets being treated have been advanced between the pressure-applying rolls. Accordingly, provision is made for collecting and retaining this excess liquid so that it is not distributed onto the next successive areas of the sheets to be treated. Collection and retention of the processing liquid is accomplished by spacing roll 70 apart from roll 72 during the terminal portion of the movement of the sandwich between the rolls after the areas of the two sheets being treated have passed between the rolls. Roll 70 is mounted on means permitting movement thereof toward and away from roll 72 and comprising a pair of arms 230 each pivotally mounted at one end on a stud 232 mounted on a side plate 38 or 40. Roll 70 is mounted at its ends between the free ends of arm 130 and includes shafts at its ends extending through openings in side plates 38 and 40. Roll 70 is biased toward roll 72 by a pair of springs 234 each engaged at one end with arm 230 and at its other end with the side plate on which the arm is mounted.

Movement of roll 70 apart from roll 72 in order to collect and retain the processing liquid is controlled by the movement of the carriage and particularly by the extensible tracks which support the carriage for movement. The apparatus includes a pair of control levers 236 each mounted at its upper end on a hub 242 mounted on an end of a shaft 238 extending between and through side plates 38 and 40 and journaled for pivotal movement in the side plates. Mounted on the lower end of each lever 236 is a pin 240 which projects outwardly into the path of movement of a bar 241 on an inner end section of one of intermediate tracks 188 in position to be engaged by bar 241 during the terminal portion of the movement of the track into extended position whereby lever 236 is pivoted from the initial position shown in FIGS. 11 and 12 in a counterclockwise direction through an intermediate position, shown in FIG. 13, to a terminal position shown in FIG. 14.

Levers 236 are biased by resilient means (not shown) into the initial position shown in FIG. 11 and are pivoted by the intermediate tracks against the bias of this means. Mounted on each of arms 230 intermediate the ends of the arm is a cam follower 244 pivoted at one end to the arm and having a V-shaped downwardly projecting cam engagement section with an apex lying closest to the pivot designated 246. Cam follower 244 is biased by a spring 249 in a clockwise direction, viewing FIGS. 11 through 15, so that the free end of the cam follower rests against a stop pin 250 mounted on arm 230. Hub 242 is provided with a cam 252 movable in an arc intersecting apex 246 of cam follower 244 from the rest position shown in FIGS. 11 and 12 [at the right of apex 246] through an intermediate position shown in FIG. 13 in which cam 252 and apex 246 are in engagement to a terminal position shown in FIG. 14 at which the cam is located to the left of the cam follower. The design of the cam follower and particularly the apex thereof is such that movement of the cam in engagement with the follower from right to left, as described, causes pivotal movement of arm 230 in a clockwise direction thereby spacing roll 70 apart from roll 72 during the pivotal movement of lever 236 at the terminal portion of the extending movement of the intermediate track. When the intermediate track is returned to its retracted position and pin 240 is disengaged from bar 241, lever 236 pivots under the bias of a resilient means in a clockwise direction to its initial position; and the design of cam follower 244 permits cam 252 to pivot cam follower 244, during return movement of the cam and control lever, without pivoting arm 230.

Movement of the tracks and carriage into extended position also releases crank 132 for return movement in a clockwise direction to the initial position of the crank shown in FIGS. 11 and 14 thereby permitting compression member 126, which cooperates with backing member 124 to compress a container of processing liquid, to pivot away from the backing member and thereby permit the introduction of another container into the apparatus at the commencement of exposure and processing of the next successive area of the photosensitive sheet. For this purpose, hub 242 is provided with a second cam 254 having a path of movement intersecting pin 146 on the lower end of latch member 140. Cam 254 engages pin 146 to pivot latch member 140 in a clockwise direction as shown in FIG. 13 disengaging pin 144 from arm 134 of crank 132 to allow the latter to rotate in a clockwise direction until arm 130 comes to rest against cam 128, as shown in FIG. 14.

Figure 16:
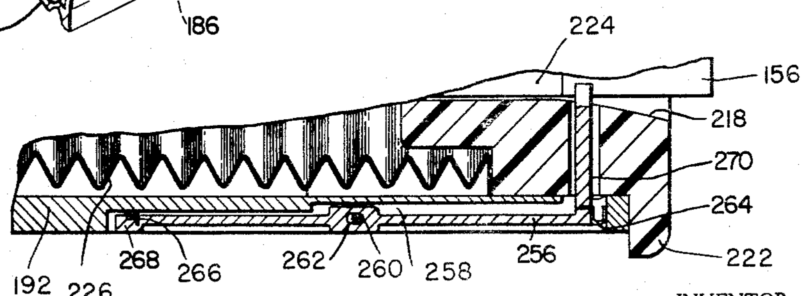
FIG. 16 is a fragmentary sectional view of a portion of the apparatus illustrating the operation of components thereof.
Figure 9:
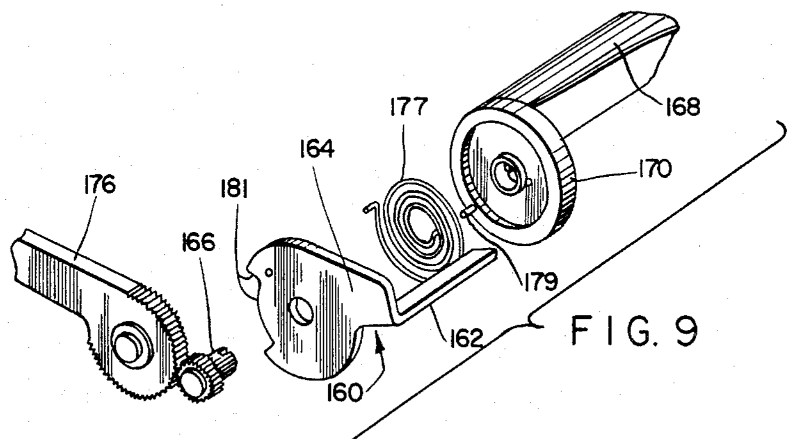
Figure 8:
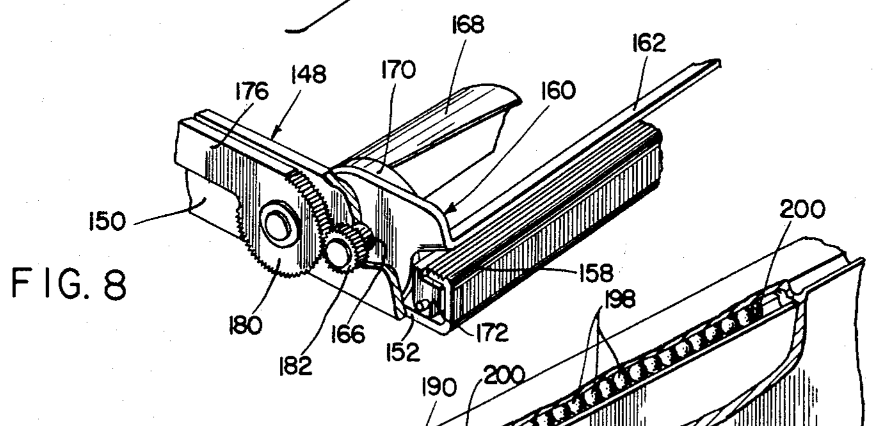
Figure 10:
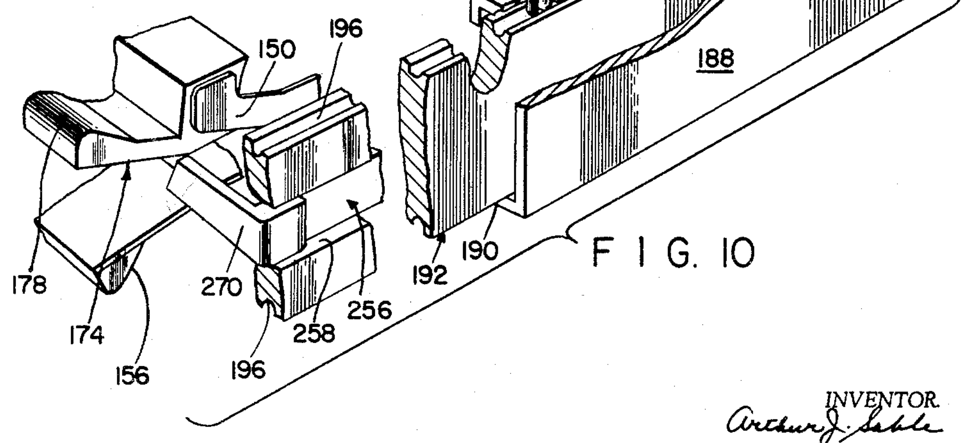

By virtue of the construction shown and described, the pressure-applying rolls are spaced apart from one another momentarily during the terminal portion of withdrawal movement of the sandwich thereby trapping processing liquid between portions of the photosensitive and second sheets at the trailing edge of the exposed and processed area of the photosensitive sheet. These portions of the sheets between which the processing liquid is retained are located, when the sandwich comes to rest, intermediate gripping jaws 158 and 162 and pressure-applying rolls 70 and 72, and hence at the leading edge of the next successive areas of the sheets to be exposed and processed so that these portions of the sheets are withdrawn at the leading end of the sandwich when the next successive areas are processed by withdrawal between rolls 70 and 72. Provision is made in the apparatus for severing the portion of the sandwich containing an exposed area and a transfer print, and include a stop for arresting the return movement of the carriage from its fully extended position at an intermediate position in which knife 168 and anvil 172 are located adjacent the leading edge of the processed areas of the sheets intermediate the leading edge thereof and the mass of liquid collected between the sheets. At this point, connecting member 178 may be pivoted toward outer end section 156 to sever the end section of the sandwich containing the processing liquid from the remainder of the sandwich containing the transfer print. The means for arresting the movement of the carriage in a partially retracted position include levers 256 each mounted in a recess 258 in the side of an end track 192. Each of levers 256 is mounted for pivotal movement, intermediate its ends, about a pin 260 engaged in a slot 262 in the intermediate portion of the lever so as to allow for axial as well as pivotal movement of the lever. Lever 256 is biased for axial movement in the return direction of the tracks by a U-shaped spring 264 engaged between an end of lever 256 and the end wall of recess 258 furthest from the housing; and is biased for pivotal movement in a counterclockwise direction, viewing FIG. 16, by a spring 266 engaged between the opposite end of lever 256 and the bottom wall of recess 258. A projection 268 is provided on the end of lever 256 closest to the housing, and spring 266 biases lever 256 outwardly so that projection 268 extends beyond the surface of end track 192 and during return movement of the end track with respect to intermediate track 188, engages the end of intermediate track 188 preventing retraction of the end track into the intermediate track. When projection 268 becomes engaged with the end of the intermediate track, lever 256 is displaced against spring 264. The end of lever 256 opposite projection 268 is provided with an inwardly projecting cam section 270 which is engaged by an arm 176 of movable lever 174 when the movable lever is pivoted to actuate knife 168. This causes pivotal movement of lever 256 in a clockwise direction withdrawing projection 268 into recess 258 from engagement with the end of intermediate track 188 allowing lever 256 to move to the left, viewing FIG. 16, under the bias of spring 264 thus locating projection 268 within recess 258 between track 192 and track 188 so that end track 192 may thereafter be retracted into track 188 following release of movable lever 174 for return movement to its initial position shown in FIGS. 11 and 12 of the drawings. The carriage is then moved to its fully retracted position, and lever 174 is again pivoted to sever the portion of the sandwich containing a transfer from the portion of the sandwich extending between the pressure-applying rolls. Each of intermediate tracks 188 is provided with an opening 274 for engaging projection 268 when the tracks are in the fully retracted position shown in FIG. 11 preventing extension of end track 192. This construction thereby functions to restrain the carriage against movement until movable lever 174 is pivoted moving the gripping jaws together into engagement with the sandwich and actuating the knife thus assuring extension of the carriage only when an end of the sandwich has been gripped between jaws 158 and 162.

The apparatus, as previously noted, is designed to be operated manually and the photosensitive sheet exposed during movement of the sheet relative to and past the light source. The exposure of each incremental area of the photosensitive sheet, as it is transported past the light source, is a function of the brightness or intensity of the light and the transport speed of the image-recording sheet. While it may be possible to insure uniform exposure by the provision of a lamp the brightness of which remains constant and transporting the image-recording sheet at a constant predetermined speed, in a hand-operated apparatus of the type described in which the manual operating force is applied more or less directly to the image-recording sheet, moving the image-recording sheet at a constant speed is difficult to achieve even by employing a governor for regulating the transport speed. The solution to this problem is to vary the brightness or intensity of the light source in direct proportion to the transport speed of the image-recording sheet to insure a predetermined and uniform exposure of successive incremental areas of the image-recording sheet over as wide a range as possible of transport speeds. In practice, however, this presents serious difficulties because many types of light sources, useful in apparatus of this type, are characterized by the fact that their brightness cannot be varied; whereas the brightness of light sources such as incandescent lamps can be easily varied merely by changing the voltage applied to the lamp. However, as the brightness of an incandescent lamp is varied [by changing the applied voltage] the color temperature of the lamp and hence the spectral distribution of the light emitted also varies resulting in a variation in the exposure of the photosensitive material due to the fact that the photosensitive material has a substantially fixed spectral sensitivity which may be limited to a portion of the visible wave length range and may vary within any particular portion of the visible wave length range. Additional factors to be considered when attempting to vary the light source brightness in accordance with the transport speed are the problems of insuring a linear relationship between lamp brightness and transport speed over a range of transport speeds which is of sufficient extension to be useful.

The document-copying apparatus embodying the invention includes means for, in effect, varying the brightness of the light source in accordance with the transport speed of the photosensitive material and operable over an extremely wide range of speeds; and in fact, it is possible to achieve uniform exposure of incremental areas of the photosensitive sheet even though movement of the photosensitive sheet is completely arrested and then recommenced during exposure of an area thereof to produce an image in the area. The effect of varying the brightness of the light source is achieved by causing the light source to emit light in pulses of uniform duration and constant brightness and spectral characteristic, at a rate which bears a fixed relationship to the transport speed of the photosensitive material. The relationship between the frequency of the light pulses and the transport speed is such that each incremental area of the image-recording sheet is exposed to the same number of light pulses which, for reasons which will appear hereinafter, is preferably more than one. With this system, the only upper limit to the transport speed is dictated by the highest frequency at which the light source may be operated; and this in turn is obviously related to the number of light pulses to which each incremental area of the photosensitive sheet is exposed and the length of the photosensitive sheet exposed during each light pulse. Because the image-recording sheet is exposed to a light pulse for each predetermined increment of distance through which the sheet is transported, movement of the sheet can be arrested completely during the interval between any two light pulses so that the sheet is not being exposed while at rest and is subjected to the same exposure when movement of the photosensitive sheet is recommenced. A problem might occur when each incremental area of the photosensitive sheet is subjected to exposure during a single light pulse; that is, when the sheet is moved at a linear rate per light pulse equal to the length (in the direction of the sheet) of the sheet exposed during each light pulse. In this case, a small portion of the sheet might be unexposed if a light pulse were to occur at the instant movement of the sheet was arrested, and this is why, in the preferred form of the apparatus, each incremental area is subjected to exposure to light during at least two pulses in which case the area of the photosensitive sheet exposed during each light pulse overlaps half of the area exposed during the previous light pulse.

An electroluminescet source of light is preferred for this purpose because it can be constructed in any shape, including the shape shown; it is relatively thin, taking up little space; it requires comparatively little current for operation; and the frequency of the pulse rate is not limited, as is the case with incandescent lamps, for example. Because electroluminescent light sources are voltage-operated devices, the brightness of which is a function of the rate of change of the voltage applied rather than the magnitude of the voltage and are characterized by a high capacitance, electric current sources designed to excite other types of light sources to pulsed light emission (particularly at high frequencies) are basically unsuited to the excitation of electroluminescent sources. The present invention contemplates the novel combination of an electroluminescent light source and a power supply especially suited for exciting the electroluminescent source. The power supply is an electric generator capable of operation by movement of the photosensitive sheet through the apparatus, thereby offering the advantage of a document-copying apparatus requiring neither an external power supply nor an internal power supply requiring recharging or replacement. Moreover, the generator is inherently capable of exciting the electroluminescent source to pulsed light emission at a frequency bearing a predetermined relationship to the transport speed and the image-recording sheet.

Figure 18:
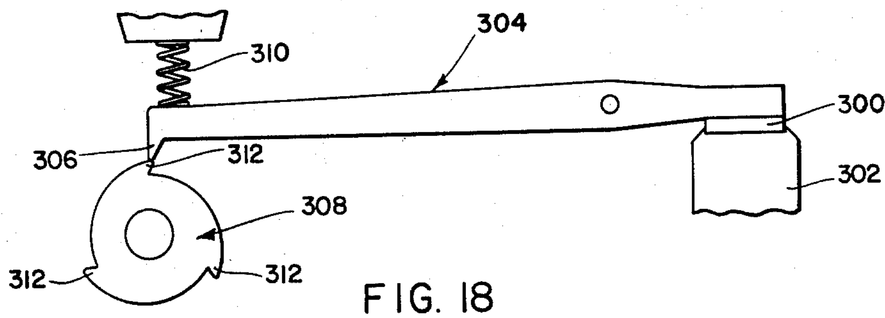
FIG. 18 is a somewhat diagrammatic view showing a piezoelectric generator comprising a component of the invention.

A generator having these charcteristics is a piezoelectric crystal which, when physically stressed, produces an electric current the voltage of which may be quite high and is a funciton of the rate of change in the stress applied to the crystal. A piezoelectric crystal generator can be connected directly to the electrodes of an electroluminescent light source and is ideally suited to excite the electroluminescent source because of the latter's requirements for current of low value and relatively high and rapidly changing E.M.F. A piezoelectric crystal generator suitable for incorporation in the document-copying apparatus shown is illustrated, somewhat schematically, in FIG. 18 of the drawings and comprises a piezoelectric crystal 300 mounted on a fixed support 302. The stress applied to crystal 300 to cause the latter to generate electricity is a compressive stress and is preferably applied at a rate slower than the rate at which the stress is relieved thereby limiting the possibility of cracking or damaging the crystal. Since the rate of stress change and in this case, stress relief, controls the magnitude and the rate of change of the voltage produced, the compressive stress on the crystal is relieved very rapidly as compared to the rate at which the stress is applied. In fact, the rate of stress application should be so slow that the voltage produced is of a character which will not excite the electroluminescent source to light emission. The means for applying stress to the crystal comprise, in the form shown, a lever 304 pivoted intermediate its ends, one of which is located in engagement with the crystal for compressing the crystal. The opposite end of the lever is provided with a cam follower 306 which coacts with a cam 308 for pivoting lever 304 to compress the crystal. Cam 308 can be driven, for example, from pressure-applying roll 72 so that the rate of rotation of the cam is always predeterminedly related to the transport speed of the image-recording sheet. The cam follower is retained in engagement with the cam by a spring 310; and the cam, in the form shown, includes three lobes designated 312 each shaped to provide for a gradual rise of the cam follower and gradual compression of the piezoelectric crystal. If successive pulses of light are to be uniform in character, i.e., brightness and duration, the compressive stress on the crystal is required to be relieved uniformly each time. Accordingly, each of lobes 312 ends abruptly and, in fact, may be undercut so that the cam follower drops off the lobe instantaneously, and the stress on the crystal is relieved, in part by spring 310, at the same rate each time regardless of the rotary speed of cam 308 and the frequency at which the stress is applied and relieved.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for producing light pulses of substantially uniform intensity at a predetermined frequency comprising, in combination:
   an electroluminescent element for emitting said light pulses when excited by a voltage having a predetermined character;
   a piezoelectric crystal responsive to a change in stress applied to said crystal for producing a voltage proportional to the rate of change of said stress;
   means for intermittently applying voltage-producing stresses having a substantially uniform rate of change to said crystal at said predetermined frequency to cause said crystal to generate a voltage as said stresses change; and
   electrically conductive means coupled with said crystal and said element for applying the voltage developed by said crystal to said element to excite the latter to light emission.

2. The apparatus of claim 1 in which said means for applying stress to said crystal include means for alternately compressing said crystal and relieving the pressure on said crystal to effect substantially uniform voltage-producing stress changes in said crystal regardless of the frequency said crystal is compressed and relieved.

3. The apparatus of claim 1 in which said means for applying stress to said crystal include means for exerting compressive pressure on said crystal at a rate insufficient to produce a voltage sufficient to excite said electroluminescent element to light emission and relieving the pressure on said crystal at a predetermined rate sufficient to produce a voltage sufficient to excite said electroluminescent element to light emission.

4. The apparatus of claim 3 in which said means for compressing said crystal relieve the pressure on said crystal almost instantaneously regardless of the frequency of the compression cycle.

5. In photographic apparatus for exposing photosensitive material during movement of said material through said apparatus, in combination:
   an electroluminescent source for emitting light pulses of substantially uniform intensity actinic to said photosensitive material when excited by a voltage having a predetermined character;
   means for guiding said photosensitive material past said source in position for exposure to light from said source;
   a piezoelectric crystal for producing a voltage when subjected to a changing stress;
   means for intermittently applying voltage-producing stresses having a substantially uniform rate of change to said crystal during movement of said photosensitive material past said source; and
   electrically conductive means coupled with said crystal and said source for applying the voltage developed by said crystal to said source to cause the latter to emit actinic light.

6. The photographic apparatus of claim 5 in which said means for intermittently applying stress to said crystal is constructed for relieving the stress on said crystal at a rate faster than the rate at which the stress is applied and relieving each successive stress at substantially the same rate regardless of the frequency at which successive stresses are applied and relieved.

7. The photographic apparatus of claim 6 in which said means for applying stress to said crystal is constructed for relieving the stress of said crystal almost instantaneously and applying stress to said crystal at a rate insufficient to cause said crystal to produce a voltage sufficient to excite said source to light emission.

8. In photographic apparatus for exposing a photosensitive element during movement of said element through said apparatus, in combination:
   an electroluminescent element capable of being excited to emit light actinic to said photosensitive element by the application of a voltage of predetermined character;
   a piezoelectric crystal responsive to a change in stress applied to said crystal for producing a voltage proportional to the rate of change of said stress;
   means for intermittently applying stress to said crystal at a frequency predeterminedly related to the linear rate of movement of said photosensitive element through said apparatus relative to said electroluminescent element to generate a voltage as said stress changes; and
   electrically conductive means coupled with said crystal and said electroluminescent element for applying the voltage developed by said crystal to said electroluminescent element to excite the latter to light emission.

9. The photographic apparatus of claim 8 in which said means for applying stress to said crystal are constructed for effecting substantially uniform voltage-producing stress changes in said crystal regardless of the frequency of said voltage producing stress changes.

10. The photographic apparatus of claim 8 in which said means for applying stress to said crystal include means for exerting compressive pressure on said crystal at a rate insufficient to produce a voltage of the character capable of exciting said electroluminescent element to light emission and relieving the pressure on said crystal at a rate sufficient to produce a voltage of the character capable of exciting said electroluminescent element to light emission.

11. The photographic apparatus of claim 10 in which said means for compressing said crystal relieve the pressure on said crystal almost instantaneously regardless of the frequency of the compression cycle.

12. Photographic apparatus as defined in claim 11 in which means are provided coupled with said photosensitive element for actuating said means for compressing said crystal at a frequency predeterminedly related to the linear rate of movement of said photosensitive element relative to said electroluminescent element.

13. In photographic apparatus for exposing photosensitive material during movement of said material through said apparatus, in combination:
   an electroluminescent source of light actinic to said photosensitive material;
   means for guiding said photosensitive material past said source in position for exposure to light from said source;
   a piezoelectric crystal for producing a voltage in response to the application of a changing stress to said crystal;
   means responsive to the movement of said photosensitive material for applying successive stresses to said crystal at a frequency predeterminedly related to the rate of movement of said photosensitive material, each of said successive stresses being applied at a rate insufficient to produce a voltage capable of causing said source to emit light and being relieved substantially instantaneously to produce a voltage capable of causing said source to emit light; and
   electrically conductive means coupled with said crystal and said source for applying the voltage developed by said crystal to said source to cause the latter to emit actinic light.

14. In photographic apparatus for exposing photosensitive material during movement of said material through said apparatus, in combination:

an electroluminescent source of light actinic to said photosensitive material;

means for guiding said photosensitive material past said source in position for exposure to light from said source;

a piezoelectric crystal for producing a voltage in response to the application of a changing stress to said crystal;

means responsive to the movement of said photosensitive material for applying successive stresses to said crystal to cause said crystal to produce voltage, said means alternately compressing said crystal and relieving the pressure on said crystal at a frequency which is predeterminedly related to the rate of movement of said photosensitive material.

15. The photographic apparatus of claim 14 in which the last-mentioned means relieves each of said successive stresses on said crystal almost instantaneously and at the same rate regardless of the frequency at which said stresses are applied.

References Cited in the file of this patent

UNITED STATES PATENTS

| | | |
|---|---|---|
| 2,925,025 | Conner | Feb. 16, 1960 |
| 2,972,937 | Suits | Feb. 28, 1961 |
| 3,082,333 | Hufferd | Mar. 19, 1963 |
| 3,096,458 | Demmy | July 2, 1963 |